United States Patent
Friend

(10) Patent No.: US 9,712,460 B1
(45) Date of Patent: Jul. 18, 2017

(54) MATCHING PORT PICK FOR RSS DISAGGREGATION HASHING

(71) Applicant: F5 NETWORKS, INC., Seattle, WA (US)

(72) Inventor: Lars Pearson Friend, Seattle, WA (US)

(73) Assignee: F5 Networks, Inc., Seattle, WA (US)

(*) Notice: Subject to any disclaimer, the term of this patent is extended or adjusted under 35 U.S.C. 154(b) by 171 days.

(21) Appl. No.: 14/010,185

(22) Filed: Aug. 26, 2013

(51) Int. Cl.
*H04L 12/937* (2013.01)
*H04L 12/801* (2013.01)

(52) U.S. Cl.
CPC ............ *H04L 49/253* (2013.01); *H04L 47/35* (2013.01)

(58) Field of Classification Search
None
See application file for complete search history.

(56) References Cited

U.S. PATENT DOCUMENTS

| | | | | |
|---|---|---|---|---|
| 2006/0004782 | A1* | 1/2006 | Eldar | 707/100 |
| 2006/0107181 | A1* | 5/2006 | Dave et al. | 714/758 |
| 2006/0195698 | A1* | 8/2006 | Pinkerton et al. | 713/181 |
| 2008/0152133 | A1* | 6/2008 | Suga | 380/45 |
| 2009/0006521 | A1* | 1/2009 | Veal et al. | 709/201 |
| 2009/0097771 | A1* | 4/2009 | Jiang et al. | 382/260 |
| 2010/0284404 | A1* | 11/2010 | Gopinath et al. | 370/392 |
| 2011/0153861 | A1* | 6/2011 | Chauhan | 709/232 |
| 2013/0022045 | A1* | 1/2013 | An et al. | 370/392 |
| 2014/0344326 | A1* | 11/2014 | Kamath et al. | 709/203 |
| 2015/0039976 | A1* | 2/2015 | Kern et al. | 714/782 |

OTHER PUBLICATIONS

"Introduction to Receive Side Scaling" (Windows Drivers), pp. 1-5. http://msdn.microsoft.com/en-us/library/windows/hardware/ff556942(v=vs.85).aspx.
"RSS Configuration" (Windows Drivers), pp. 1-3. http://msdn.microsoft.com/en-us/library/windows/hardware/ff570724(v=vs.85).aspx.
"RSS Hashing Types" (Windows Drivers), pp. 1-4. http://msdn.microsoft.com/en-us/library/windows/hardware/ff570726(v=vs.85).aspx.

* cited by examiner

*Primary Examiner* — Jeffrey M Rutkowski
*Assistant Examiner* — Ning Li
(74) *Attorney, Agent, or Firm* — John W. Branch; Lowe Graham Jones PLLC

(57) ABSTRACT

Embodiments are directed towards selecting a local port number for server side connections that hash to a same processor as a matching client side flow on a multiprocessor device using Receive Side Scaling (RSS) for the disaggregation hash. A hash of a flow key is computed with an initial port number. An exclusive-or (XOR) distance is computed to a desired hash, using least significant bits. An XOR is performed on a corrected pre-computed collision value, to transform the source port number to a value that hashes correctly with other elements within the flow key. The transformed source port number may then be inserted into network packets sent to a server device, such that the transformed source port number can be used in a returning RSS hash to again select the same processor.

19 Claims, 4 Drawing Sheets

Swizzle Table

Possible Initialization Vectors
(IV)

MATCHING PORT PICK FOR RSS DISAGGREGATION HASHING

TECHNICAL FIELD

The subject innovations relate generally to network routing, and, more particularly, but not exclusively to selecting a local port number for server side connections that when using Receive Side Scaling (RSS) will hash to a same device as a matching client side flow within a multiprocessor device.

BACKGROUND

The expanded use of the Internet has increased communication connections between client devices and server devices. Often, management of the connections is performed through intermediate devices that might operate as a proxy device to balance work load, as well as to perform other actions, across a plurality of server devices. In some environments, the intermediate devices might be implemented within a multiprocessor device that is also load balanced. One mechanism used to load balance the intermediate devices is known as Receive Side Scaling (RSS). Briefly, RSS operates as a network driver technology that enables distribution of received network processing across multiple central processing units (CPUs) within a multiprocessor device. One of the benefits RSS includes is making denial of service (DOS) attacks more difficult to implement. RSS does so, in part, by employing a hash algorithm that is computationally intensive to deliberately generate hash collisions subsequently useable in DOS attacks. However, implementation of RSS within a proxy environment often makes it complicated to ensure that network packets returned to the multiprocessor device from a server device will return to the same CPU within the multiprocessor device that sent related network packets to the server device. Therefore, it is with respect to these considerations and others that the subject innovations have been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified. For a better understanding, reference will be made to the following Detailed Description, which is to be read in association with the accompanying drawings, wherein.

DETAILED DESCRIPTION

Figure 1:
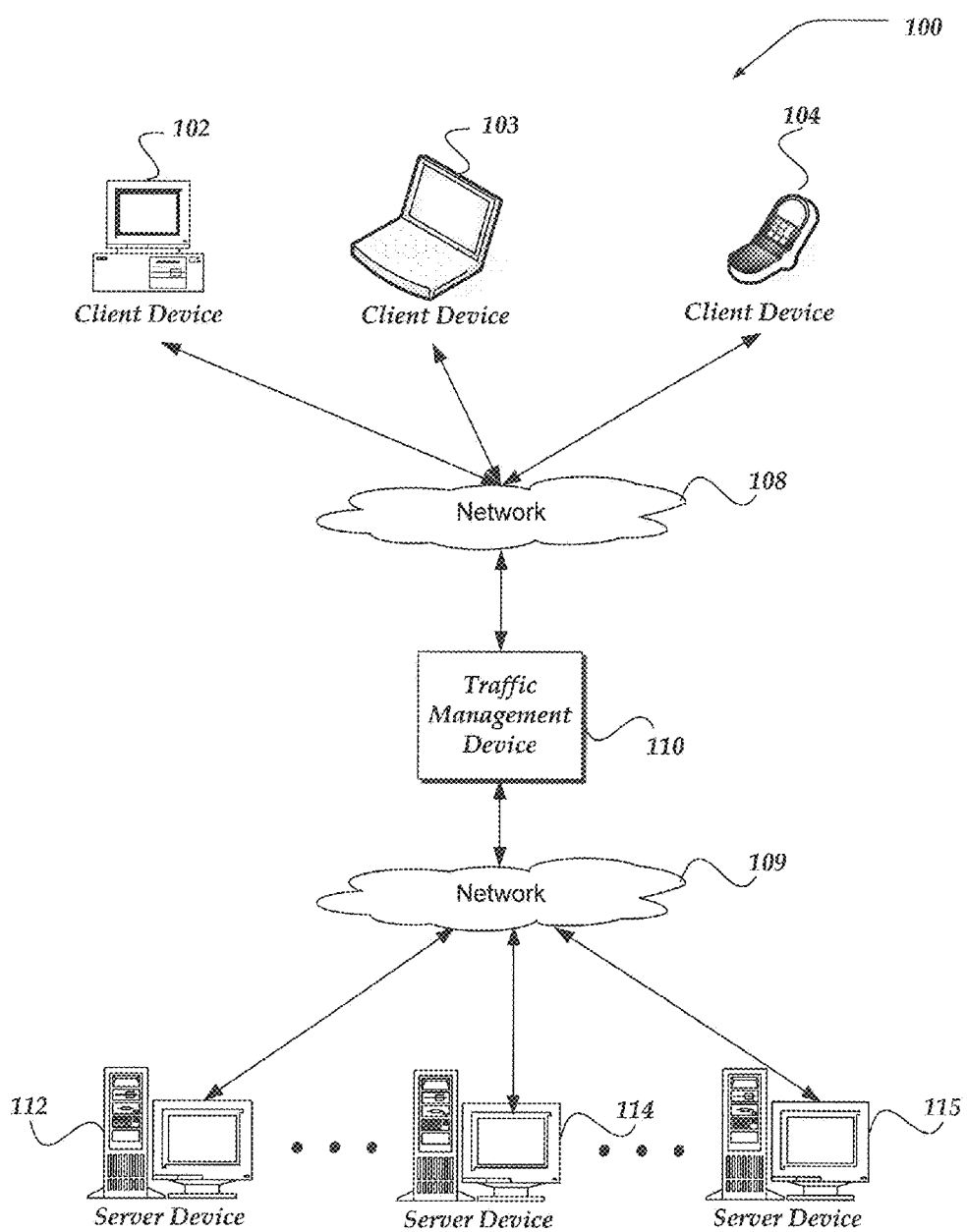
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "tuple" refers to a set of values that identify a source and destination of a connection. In one embodiment, a 5 tuple may include a source Internet Protocol (IP) address, a destination IP address, a source port number, a destination port number, and a protocol identifier. In at least one of the various embodiments, tuples may be used to identify network flows (e.g., connection flows). However, a tuple need not be a 5 tuple, and other combinations of the above may also be used. For example, a tuple may be a four-tuple, using a source IP address, a destination IP address, a source port number, and a destination port number. Other combinations are also considered. Moreover, as used herein, a "flow key" refers to a tuple comprising any combination of fields selected from within a network packet header, including those fields identified above.

As used herein, the terms "network flow," "connection flow,", and "flow" refer to a network session that may be established between two endpoints. A connection flow may include network packets that flow from a first endpoint towards the second endpoint, and network packets that flow from the second endpoint towards the first endpoint, each of these activities indicate directional flows within a connection flow. In at least one of the various embodiments, a tuple may describe the flow. In at least one of the various embodiments, flow control data associated with connection flows may be used to ensure that the network packets sent between the endpoints of a connection flow may be routed along the same path.

As mentioned above, RSS refers to a network driver technology that is directed towards enabling an efficient distribution of received network packets across multiple CPUs in a multiprocessor device. Briefly, an initialization vector (IV), typically one 32 bit word longer than a maximum flow key in use is selected and used for all incoming flow keys. For each bit set in the flow key, a corresponding 32 bit window offset into the IV by of the same number of bits as the set bit is offset into the flow key is exclusively or'ed (XOR) into an accumulator. Typically, such actions may be performed relatively quickly in hardware, rather than in software.

As noted above, RSS employs a flow key that includes various fields extracted from a network packet. In one embodiment, the flow key uses a concatenation of a source IP address (src IP), a destination IP address (dest IP), a source port number (src port), and a destination port number (dest port) in packet order. A simplistic implementation includes performing a bit test, shift, load, and conditional XOR per bit of the flow key. However, placing bits in the initialization vector can be difficult because the bits that indicate a port number for an IP version 4 (IPv4) flow are often part of the IP address in an IPv6 flow key. Moreover, because the hash value in the RSS processing is formed entirely from the initialization vector bits, it can be difficult to work the RSS backwards. This makes finding a local port number for a matching return flow difficult. Further, a brute force matching port number search becomes more time consuming as the number of CPUs in the multiprocessor device increases (increasing a number of destinations reduces the odds that any given port number will map to a desired destination).

However, an analysis of how the RSS operates indicates that each flow key bit position has an opportunity to alter a final hash in a predictable way. That is bit n, when set, will always XOR the hash with IV[n+31 . . . n]. By extension, each byte of input has a similarly predictable effect on the output. This analysis indicates that an approach might lend itself to a table driven implementation. Moreover, using an IV that consists of a repeating pattern of x bits, where x is a width of a smallest key element, allows for creation of smaller tables. In one embodiment, x is 16 bits, selected as a width of a Transmission Control Protocol (TCP) port number. However, other embodiments employ different values for x. As such, the innovations discussed herein are not constrained to x being 16 bits.

Moreover, because some embodiments of a network interface controller (NIC) card use a selected number of low end bits in the hash to assign a queue from an RSS hash, this enables a further reduction in a size of the tables. In one embodiment, as discussed below, the lower three to seven bits may be used. As used herein, the low end bits refer to those bits at a far right side of a field of bits. Thus, in a field of bits comprising "10110010," the right most "0" is the lowest end bit. Low end bits are also referred to as the least significant bits (LSB).

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards employing an O(1) approach for selecting a local port number for server side connections that hash to a same processor as a matching client side flow on a multiprocessor device using RSS for the disaggregation hash. A lookup table (referred herein as swizzle table) is constructed of pre-computed hash collisions that cover a full address space of bits used to select a destination. That is, the table is constructed of sufficient size to hold as many source port numbers as specified by a number of least significant bits of interest in the hash. Then, a hash of a flow key is computed with a random (or client device supplied) initial port number. A XOR distance is computed to a desired hash, using again the least significant bits. Then an XOR is performed on a corrected one of a pre-computed collision value, from the table, to transform the source port number to a value that hashes correctly with other elements within the flow key. The transformed source port number may then be inserted into network packets sent to a server device, such that the transformed source port number can be used in a returning RSS hash to again select the same processor.

While a table is discussed above, and elsewhere, it is relevant to note that implementations need not employ a table structure. Other mechanisms may also be employed instead. For example, a linked list, a spreadsheet, a database, or any of a variety of other mechanisms may be employed.

As used herein O(.), sometimes called big O notation, describes a limiting behavior of a function when an argument tends towards a particular value or infinity, usually in terms of simpler functions. Big O notation is used to classify algorithms by how they respond (e.g., in their processing time or working space requirements) to changes in input size and is often used to estimate an "error committed" while replacing the asymptotic size, or asymptotic mean size, by the value, or mean value, it takes at a large finite argument. As used herein then O(1) refers to a constant order.

Illustrative Operating Environment

FIG. 1 shows components of an illustrative environment 100 in which the described embodiments may be practiced. Not all the components may be required to practice the described embodiments, and variations in the arrangement and type of the components may be made without departing from the spirit or scope of the described embodiments. FIG. 1 illustrates client devices 102-104, networks 108-109, server devices 112-115, and Traffic Management Device (TMD) 110.

Generally, client devices 102-104 may include virtually any computing device capable of connecting to another computing device and receiving information. Such devices may include personal computers, multiprocessor devices, microprocessor-based or programmable consumer electronics, network devices, server devices, and the like. Client devices 102-104 may also include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-104 may also include virtual computing devices running in a hypervisor or some other virtualization environment. As such, client devices 102-104 may range widely in terms of capabilities and features.

A web-enabled client device may include a web browser application that is configured to receive and to send web pages, web-based messages, and the like. The web browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HTML, eXtensible Markup Language (XML), Compact HTML (cHTML), EXtensible HTML (xHTML), or the like, to display and send a message.

Client devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 102-104 may uniquely identify themselves through any of a variety of mechanisms, including a phone number, Client Identification Number (MIN), an electronic serial number (ESN), or other client device identifier. The information may also indicate a content format, and/or a capability of the client device.

As further shown in FIG. 1, networks 108-109 are configured to couple network enabled devices, such as client devices 102-104, TMD 110, and server devices 112-115, with other network enabled devices. Networks 108-109 are enabled to employ any form of computer readable media for communicating information from one electronic device to another. In one embodiment, network 108 may include the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs to enable messages to be sent from one to another. Also, communication links within LANs typically include fiber optics, twisted wire pair, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those Skilled in the art.

Networks 108-109 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, 4G, and future access networks may enable wide area coverage for network devices, such as client devices 102-104, or the like, with various degrees of mobility. For example, networks 108-109 may enable a radio connection through a radio network access such as Global System for Mobil communication (GSM), General Packet Radio Services (GPRS), Enhanced Data GSM Environment (EDGE), Wideband Code Division Multiple Access (WCDMA), and any other wireless technology.

Furthermore, remote computers and other related electronic devices could be remotely connected to either LANs or WANs via a modem and temporary telephone link, a DSL modem, a cable modem, a fiber optic modem, an 802.11 (Wi-Fi) receiver, and the like. In essence, networks 108-109 include any communication method by which information may travel between one network device and another network device.

One embodiment of a Traffic Management Device (TMD) 110 is described in more detail below in conjunction with FIG. 2. Briefly, however, TMD 110 includes virtually any network device that manages network traffic. In one embodiment, TMD 110 represents a device that includes a plurality of multiprocessors, or processing units (PUs), each operating relatively independently. Devices that may operate as TMD 110 include, for example, routers, proxies, firewalls, load balancers, cache devices, application accelerators, devices that perform network address translation, any combination of the preceding devices, or the like. TMD 110 may control, for example, the flow of data packets delivered to or forwarded from an array of server devices, such as server devices 112-115.

TMD 110 may direct a request for a resource to a particular server device based on network traffic, network topology, capacity of a server device, content requested, and a host of other traffic distribution mechanisms. TMD 110 may receive data packets from and transmit data packets to the Internet, an intranet, or a local area network accessible through another network, TMD 110 may recognize packets that are part of the same communication, flow, and/or stream and may perform special processing on such packets, such as directing them to the same server device so that state information is maintained. TMD 110 also may support a wide variety of network applications such as Web browsing, email, telephony, streaming multimedia and other traffic that is sent in packets. The BIG-IP® family of traffic managers, by F5 Networks of Seattle, Wash., are examples of TMDs.

In one embodiment, TMD 110 may be implemented as a multiprocessor device having a plurality of processors, each operating to perform various traffic management actions. As a client device seeks access to content, applications, or the like, available on one or more server devices 112-115, the communication is received by TMD 110. As discussed further below, a Network Interface Card (NIC) may employ an RSS hash to load balance communications across the various processing units (PUs) within TMD 110. When the selected PU within TMD 110 receives the communications, the selected PU may perform various actions on the communications. In some embodiments, the PU may select one or more server devices in which to send the communications towards. As discussed above, it is desirable that the same PU that sends the client communications towards a server device also receives the responses from the server device. Thus, the PU may employ a process such as described below in conjunction with FIG. 3, to perform a local port selection useable to ensure that the response from the server device is sent back to the same PU based on use of another RSS hash.

Server devices 112-115 may include any computing device capable of communicating packets to another network device. Each packet may convey a piece of information. A packet may be sent for handshaking, i.e., to establish a connection or to acknowledge receipt of data. The packet may include information such as a request, a response, or the like. Generally, packets received by server devices 112-115 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between server devices 112-115, TMD 105, and client device 102 employing HTTP, HTTPS, or any of a variety of protocols.

In one embodiment, server devices 112-115 are configured to operate as a website server. However, server devices 112-115 are not limited to web server devices, and may also operate a messaging server, a File Transfer Protocol (FTP) server, a database server, content server, and the like. Additionally, each of server devices 112-115 may be configured to perform a different operation. Thus, for example, server device 112 may be configured as a messaging server, while server device 113 is configured as a database server. Moreover, while server devices 112-115 may operate as other than a website, they may still be enabled to receive an HTTP communication, as well as a variety of other communication protocols.

Devices that may operate as server devices 112-115 include personal computers, desktop computers, multiprocessor devices, microprocessor-based or programmable consumer electronics, network PCs, server devices, and the like.

Illustrative Network Device

Figure 2:
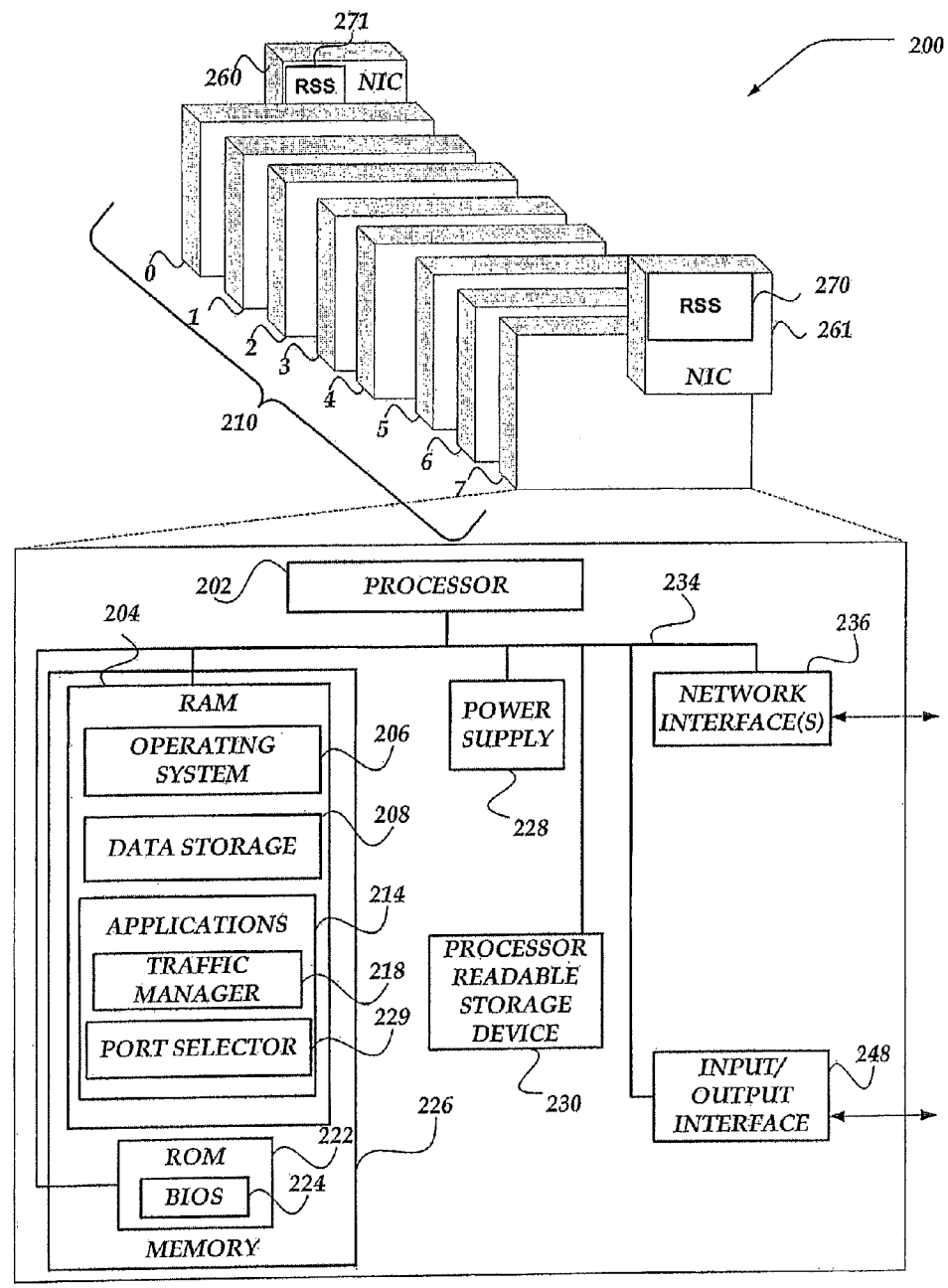
FIG. 2 shows an embodiment of a network device that may be included in a system such as that shown in FIG. 1.

FIG. 2 shows an embodiment of a network device that may be included in a system such as that shown in FIG. 1. As shown, network device 200 represents a multiprocessing implementation of TMD 110 of FIG. 1. Network device 200 may include many more or less components than those shown. The components shown, however, are sufficient to disclose an illustrative embodiment for practicing the invention.

Network device 200 is shown as having 8 processing units (PUs) 210, numbered from 0 to 7. However, network device 200 may include many more or less PUs. Network device 200 is shown as also including network interface units 260-261. Network interface units 260-261 are sometimes known as a transceiver, transceiving device, or a network interface controller (NIC) card.

Network interface units 260-261 are illustrated as including RSS 270-271, respectively, as network driver technology components. In at least one embodiment, RSS 270-271 are implemented as hardware components, using any of a variety of technologies. In one embodiment, RSS 271 may be configured to operate on network packets received from a client device, while RSS 270 might be configured to operate on network packets received, from a server device. In other embodiments, NICs 260-261 may be implemented as a single NIC, having a single RSS component to perform actions on packets received from a server device, and on packets received from a client device. Thus, other implementations are envisaged.

Briefly, RSS 271 may receive a packet, select a flow key from information within the received packet, and perform a hash on the flow key that is then useable to select one of the PUs within PU 210 in which to forward the packet. In one embodiment, the flow key comprises a concatenation of Src IP, Dest IP, Src Port, Dest Port in packet order. However, in other embodiments, the flow key may comprise other defined areas in the received packet, including noncontiguous fields within the packet. A number of least significant bits (LSB) of the hash value are then used to index an indirection table. The values in the indirection table are used to assign the received packet to one of the PUs. Similarly, packets received from the server device may be received by RSS 270, which selects a flow key from the same fields used by RSS 271. The hash value generated is also used to index an indirection table useable to select one of the PUs. For communications that are related, within the same communication flow, it is desired that RSS 270-271 select the same PU to perform processing on the packets. Therefore, each PU may perform actions to ensure that information used to generate the flow keys enable the same PU to be selected.

FIG. 2 further illustrates a non-limiting, non-exhaustive example expansion of a PU. While PU 7 is illustrated, each of the other PUs may include somewhat similar, albeit different, components. Moreover, a PU may include more or less components than those illustrated. However, as shown, PU 7 of PUs 210 includes processing unit 202, and mass memory, all in communication with each other via bus 234. The mass memory generally includes RAM 204, ROM 222, and one or more permanent mass storage devices, such as processor readable storage device 230, tape drive, optical drive, and/or floppy disk drive. The mass memory stores operating system 206 for controlling the operation of PU 7. PU 7 also includes applications 214, which includes traffic manager 218 and port selector 229.

As illustrated in FIG. 2, PU 7 also can communicate with the Internet, or some other communications network via network interfaces 236, which is constructed for use with various communication protocols including the TCP/IP protocol. Network interfaces 236, may for example, communication to devices external to network device 200 through NICs 260-261. Network interfaces 236 are sometimes known as a transceiver, transceiving device, or network interface controller (NIC) card. In one embodiment, network interfaces 236 may have associated with it a local address, or IP address, and/or a plurality of port numbers (or local port numbers). In some embodiments, network interfaces 236 represents one of the selectable queues chosen by RSS 260-261.

The mass memory as described herein illustrates another type of computer readable media, namely computer storage devices. Computer storage devices may include volatile, nonvolatile, removable, and non-removable devices implemented in any method or technology for non-transitory storage of information, such as computer readable instructions, data structures, program modules, or other data. Examples of computer storage devices include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical non-transitory medium which can be used to store the desired information and which can be accessed by a computing device.

The mass memory also stores program code and data. One or more applications 214 are loaded into mass memory and run on operating system 206, wherein the computer-executable instructions of applications 214 are executed within processor 202. Examples of application programs may include email programs, routing programs, schedulers, calendars, database programs, word processing programs, HTTP programs, traffic management programs, security programs, and so forth.

PU 7 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, PU 7 may further include applications that support virtually any secure connection, including TLS, TTLS, EAP, SSL, IPSec, and the like.

PU 7 may also include traffic manager 218 that is configured to control the flow of data packets delivered to and forwarded from various devices. Traffic manager 218 may direct a request for a resource to a particular device based on network traffic, network topology, capacity of a device, content requested, and a host of other traffic distribution mechanisms. Traffic manager 218 may receive data packets from and transmit data packets to the Internet, an intranet, or a local area network accessible through another network. Traffic manager 218 may recognize packets that are part of the same communication, flow, and/or stream and may perform special processing on such packets, such as directing them to the same server so that state information is maintained.

PU 7 may also include input/output interface 248 for communicating with external devices, such as a mouse, keyboard, scanner, or other input devices not shown in FIG. 2. Likewise, PU 7 may further include additional mass storage facilities such as CD-ROM/DVD-ROM drive and hard disk drive. Hard disk drive may be utilized to store, among other things, application programs, databases, and the like.

In one embodiment, the PU 7 may operate within at least one Application Specific Integrated Circuit (ASIC) chip. The ASIC chip can include logic that performs some of the actions of PU 7. For example, in one embodiment, the ASIC chip can perform a number of packet processing functions for incoming and/or outgoing packets. In one embodiment, the ASIC chip can perform at least a portion of the logic to enable the operations of traffic manger 218 and port selector 229. Port selector 229 is configured to perform actions that include those discussed below in conjunction with FIG. 3 including selecting a local port number for server side connections that will hash to the same PU number as the matching client side flow. In one embodiment, PU 7 can further be implemented in one or more field-programmable gate arrays (FPGA), instead of, or in addition to, the ASIC chip.

While the above illustrates each PU as having its own memory, operating system, and so forth, other embodiments may also be employed. For example, in another embodiment, each PU with PUs 210 may share memory, operating system, and/or other components, having, however, separate processors and an application context which are selected. Moreover, the separate network interfaces for each PU may represent one of the selectable queues that is chosen via use of the RSS hash of incoming packets.

General Operation

Figure 3:
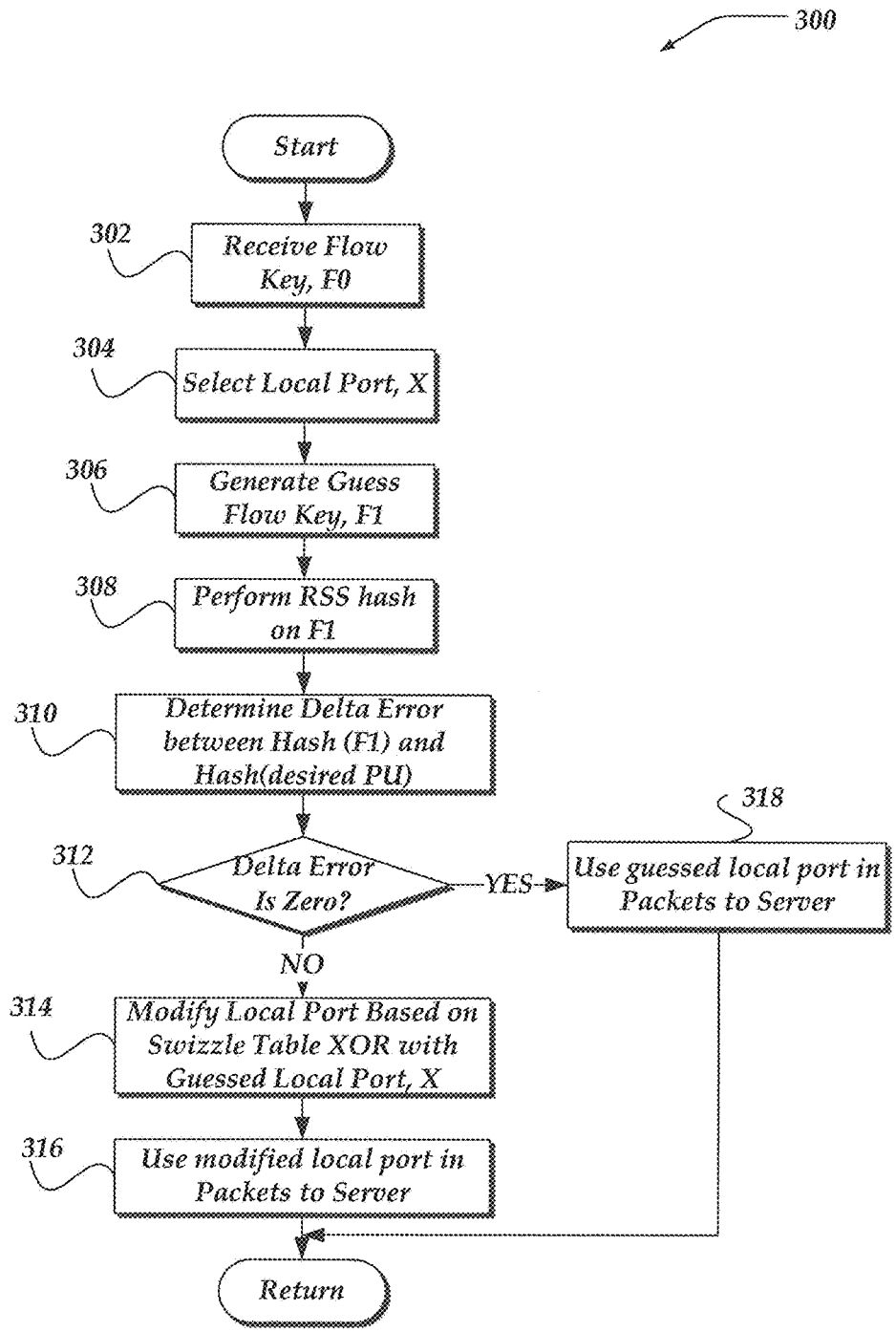
FIG. 3 shows a flowchart showing one embodiment of a process useable to select a local port number for use in ensuring that returning network packets return to a same device as sending related network packets.

The operation of certain aspects will now be described with respect to FIG. 3. FIG. 3 shows a flowchart showing one embodiment of a process useable to select a local port number for use in ensuring that returning network packets return to a same device as sending related network packets. Process 300 of FIG. 3 may be implemented within PUs 210 of FIG. 2. It should be noted that while the discussions herein refer to selection of a local port number, embodiments are not so constrained. References are to local port number, because this is the field in the LSB of one embodiment of a flow key (that is a concatenation of Src IP, Dest IP, Src Port, Dest Port in packet order) for receiving traffic. However, where the LSB of the flow key represent a different field, the selection disclosed in process 300 may select bits for that different field, instead.

It is noted that RSS is designed such that each bit in the flow key has approximately the same chance to affect change of each bit in the hash, therefore, it is not required that the LSB of the flow key change. However, selection of the local port, when initiating an outgoing TCP connection to a known server at a known IP address requesting a server that lives at a know port, suggests that the originating local port is most readily available as a parameter to vary in a given flow key. However, as noted, where the flow key includes different fields, another field might be selected to be varied.

Process 300 leverages that for any bit range R in a flow key, each distinct value of R will XOR some fixed value S[R] into the hash, where S[.] represents the RSS hash algorithm, and further that R1 XOR R2 will effectively XOR the hash with S[R1] XOR S[R2]. That is:

Hash(Flow1)XOR Hash(Flow2)=Hash(Flow1 XOR Flow2).

Thus, for example, if a flow key has a hash of 0x5A (where the 0x prefix specifies that the numbers are expressed in base 16—hexadecimal), and it is wanted to transform the value to a flow key with a hash of 0x21, then can XOR 0x5A by 0x21 to obtain 0x7B. Then looking up a port number that on its own hashes to 0x7B and XOR that port number into a port number in the desired flow key, will have a guess that will hash to the correct value.

Process 300 therefore, begins, after a start block, at block 302 where a packet is received, and a flow key, F0, is obtained. As an aside, the flow key, F0 could have been hashed using the RSS hash to select the PU to receive the packet, through use as an index into an indirection table. As an aside, such an indirection table might include hash values mapped to identifiers of the available PUs. For example, a hash value of 000 might map to PU 0, a hash value of 001 maps to PU 1, and so forth, in the indirection table.

Continuing next to block 304, a local port number is selected to form an address on the internal side of the PU, to the server device. In one embodiment, the selected local port number is the client's source port number. Other values might also be used, including a previously used value, a randomly selected port number from a list of available port numbers, or the like. Continuing to block 306, the internal address, and the client's source port number may be used as a guess for flow key, F1.

Continuing to block 308, an RSS hash is performed on flow key F1. Flowing next to block 310, an RSS hash is performed on the PU's address, and a delta error between the Hash of F1 and the Hash of the desired PU is determined by performing an exclusive-OR on the LSBs of the hash of F1 and the hash of the desired PU. In one embodiment, only a number of the LSBs are used to perform a comparison and generate the delta error.

Flowing to decision block 312, a determination is made whether the delta error is zero. If so, then the selected port number will generate an RSS hash that enables packets of the same communication flow to return to the same PU. Thus, processing flows to block 318. Where the delta error is non-zero, processing flows to block 314.

At block 318, the guessed local port number is used to generate packet headers for packets from the PU towards a server device. Processing then returns to a calling process.

At block 314, however, the delta error is used as an index into a swizzle table to identify a port number correction value. One embodiment of swizzle table is described in more detail below in conjunction with FIG. 4. The port number correction value is then XOR'ed with the previous guessed local port number to provide a modified local port number that is directed towards being used to RSS hash to the desired port number.

Process 300 then flows to block 316 where the modified local number is used to generate packet headers for packets from the PU towards a server device, to ensure that the server device returns packets with header information that will RSS hash to the same PU (using the indirection table). Process 300 then returns to a calling process.

In some embodiments, it may be cost/time efficient to save a partial hash for subsequent tries during a port search, since for IPv4 port numbers might represent $\frac{1}{6}^{th}$ of the effort, and for IPv6, the port might represent $\frac{1}{18}^{th}$ of the effort. Moreover, a carefully executed hash transformation ails an O(1) selection of a port number. If, however, this port number is not available, then the above can fall back on a sequential search to find a next available port number.

Moreover, while the above discusses use of the RSS to select a PU from the plurality of PUs. Other hashing algorithms based on a flow key may also be used. Therefore, it should be recognized that the embodiments herein are not constrained to use RSS.

It will be understood that figures, and combinations of actions in the flowchart-like illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational actions to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions.

Illustrative Non-Limiting, Non-Exhaustive Example of Swizzle Table

Figure 4:
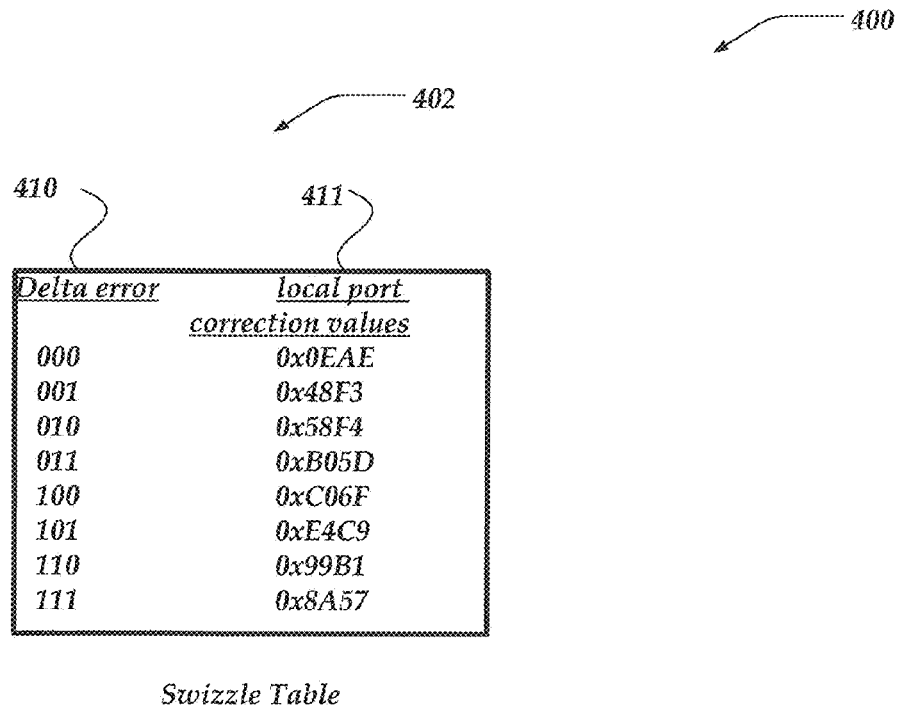
FIG. 4 shows one non-exhaustive, non-limiting example of a possible swizzle table and possible initialization vectors useable in conjunction with the process of FIG. 3.
Figure 4:
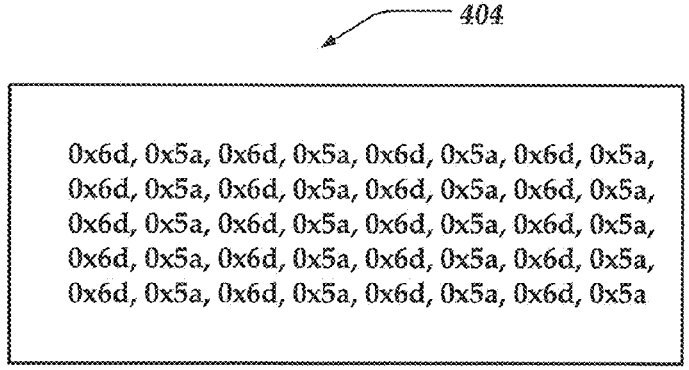

FIG. 4 shows one non-exhaustive, non-limiting example of a possible swizzle table 402 and possible initialization vectors (IV) 404 useable in conjunction with the process of FIG. 3.

Table 402 may be implemented using other mechanisms besides a table structure. Moreover, table 402 may include more or less components that shown. As shown in FIG. 3, the values shown include the prefix 0x, which specifies that the numbers are expressed in base 16. However, other embodiments may employ a different base value.

In any event, table 402 includes delta errors 410 and local port correction values 411, as used in process 300 of FIG. 3. Eight rows are illustrated that map to the eight PUs shown in FIG. 2. Should more/less PUs be used, then table 402 may be expanded/reduced accordingly. Moreover, as shown, delta errors 410 represent the errors computed from the least significant three bits of the hash. It should be noted that the local port correction values 411 have been selected to be valid for any of the initialization vectors used by the RSS computation shown in IV 404. Should different IV values be used, then local port correction values 411 might need to be recomputed.

The following provides one non-limiting, non-exhaustive example of how process 300 might operate using table 402. Assume a client device connects from source IP address 192.168.1.1 with port number 51208 (often written as 192.168.1.1:51208), to TMD 110 of FIG. 2 at destination address 10.1.0.10 and port number 80. The destination address 10.1.0.10 and port number 80 may be used to generate flow key F0. Using the RSS hash, the last three bits would hash to 110. Using the indirection table the hash 110 maps to PU #6.

Now it is desired to connect on the client device's behalf (from an address on an internal side of the PU to a server device). So, an initial flow key, F1, is generated from 10.2.0.10:51208 (the internal IP address, and the client device's source port number) to provide 10.2.012:80.

The flow key F1 hashes, however, to produce in the last three bits 101, which would incorrectly map to PU #5, rather than the desired PU #6. The delta error would then be 101 XOR 110=011, which is 3.

Therefore, using this delta error of 3 as an index into table 402, a local port correction value of 0xB05D is obtained. This value is XOR'ed with the base 16 value of the guessed port number, which was 51208 (51208 in base 16 is 0xC808). That is: 0xC808 XOR 0xB05B 0x7855, which in decimal is 30805. 30805 then represents the modified local port number, that is, the new flow key using this value would be derived from (10.2.0.10:30805→10.2.0.13:80).

To confirm this works, another RSS hash can be generated from F2, finding that the last three bits of the hash are now 110, which points to PU #6.

The above specification, examples, and data provide a complete description of the manufacture and use of the composition of the invention. Since many embodiments of the invention can be made without departing from the spirit and scope of the invention, the invention resides in the claims hereinafter appended.

The invention claimed is:

1. A method for managing communications, the method comprising:
    receiving, at a Processing Unit (PU) within a plurality of PUs, a first network packet from a network interface controller (NIC) card that is configured to perform a Receive Side Scaling (RSS) hash to select the PU;
    generating a first flow key based on data within the first network packet;
    selecting an initial source port number;
    generating a second flow key using the initial source port number and source network address information internal to the PU;
    performing a first RSS hash on at least a portion of the first flow key, and a second RSS hash on at least a portion of the second flow key;
    determining a delta error between the first RSS hash and the second RSS hash;
    when the delta error is determined to be non-zero, performing actions including:
        using the delta error as an index to a swizzle table to identify a local port correction value that is based on an initialization vector, wherein the swizzle table is populated with local port correction values that are valid for initialization vectors employed for selecting initial source port numbers;
        performing an exclusive-or on the initial source port number and the local port correction value to generate a modified source port number; and
        generating network packets using the source network address information internal to the PU and the modified source port number, to ensure that a second network packet returning to the network device is hashed using the RSS in the NIC to select the same PU as having received the first network packet, wherein the modified source port number is employed to generate headers for the network packets; and
    when the delta error is determined to be zero, generating network packets using the source network address information internal to the PU and the initial source port number to ensure that the second network packet returning to the network device is hashed using the RSS in the NIC to select the same PU as having received the first network packet.

2. The method of claim 1, wherein determining the delta error further comprises performing an exclusive-or on a defined number of least significant bits in the first RSS hash and the second RSS hash.

3. The method of claim 1, wherein the initial source port number is a source port number associated with a client device sending the first network packet.

4. The method of claim 1, wherein the NIC employs an indirection table that employs an index using a defined number of least significant bits of the RSS hash to select one of the PUs from within the plurality of PUs to send the network packet, the RSS hash being performed using the first flow key.

5. The method of claim 1, wherein the first flow key and second flow key comprise a source Internet Protocol (IP) address, a destination IP address, a source port number, and a destination port number.

6. The method of claim 1, wherein the generated network packets are forwarded to a server device within a plurality of server devices, selected in part based on a load balancing algorithm.

7. The method of claim 1, wherein the initial source port number is selected randomly from a list of available port numbers.

8. A network device, comprising:
- at least one network interface controller (NIC) card configured to perform a Receive Side Scaling (RSS) hash to select a destination processor unit (PU) within the network device for network packets; and
- a plurality of processor units (PUs), each PU having at least one processor that is configured to perform actions, including:
  - receiving a first network packet through the at least one NIC card;
  - generating a first flow key based on data within the first network packet;
  - selecting an initial source port number;
  - generating a second flow key using the initial source port number and source network address information internal to the PU;
  - performing a first RSS hash on at least a portion of the first flow key, and a second RSS hash on at least a portion of the second flow key;
  - determining a delta error between the first RSS hash and the second RSS hash;
  - when the delta error is determined to be non-zero, performing actions including:
    - using the delta error as an index to a swizzle table to identify a local port correction value that is based on an initialization vector, wherein the swizzle table is populated with local port correction values that are valid for initialization vectors employed for selecting initial source port numbers;
    - performing an exclusive-or on the initial source port number and the local port correction value to generate a modified source port number; and
    - generating network packets using the source network address information internal to the PU and the modified source port number, to ensure that a second network packet returning to the network device is hashed using the RSS in the NIC to select the same PU as having received the first network packet, wherein the modified source port number is employed to generate headers for the network packets; and
  - when the delta error is determined to be zero, generating network packets using the source network address information internal to the PU and the initial source port number to ensure that the second network packet returning to the network device is hashed using the RSS in the NIC to select the same PU as having received the first network packet.

9. The network device of claim 8, wherein determining the delta error further comprises performing an exclusive-or on a defined number of least significant bits in the first RSS hash and the second RSS hash.

10. The network device of claim 8, wherein the initial source port number is a source port number associated with a client device sending the first network packet.

11. The network device of claim 8, wherein the at least one NIC employs an indirection table that employs an index using a defined number of least significant bits of the RSS hash to select one of the PUs from within the plurality of PUs to send the network packet, the RSS hash being performed using the first flow key.

12. The network device of claim 8, wherein the first flow key and second flow key comprise a source Internet Protocol (IP) address, a destination IP address, a source port number, and a destination port number.

13. The network device of claim 8, wherein the generated network packets are forwarded to a server device within a plurality of server devices, selected in part based on a load balancing algorithm.

14. A non-transitory computer readable storage device, having computer-executable instructions stored thereon, that in response to execution by a processor unit (PU) within a plurality of PUs with a network device, cause the PU to perform operations, comprising:
- receiving, at the Processing Unit (PU) within the plurality of PUs, a first network packet through from a network interface controller (NIC) card that is configured to perform a Receive Side Scaling (RSS) hash to select the PU;
- generating a first flow key based on data within the first network packet;
- selecting an initial source port number;
- generating a second flow key using the initial source port number and source network address information internal to the PU;
- performing a first RSS hash on at least a portion of the first flow key, and a second RSS hash on at least a portion of the second flow key;
- determining a delta error between the first RSS hash and the second RSS hash;
- when the delta error is determined to be non-zero, performing actions including:
  - using the delta error as an index to a swizzle table to identify a local port correction value that is based on an initialization vector, wherein the swizzle table is populated with local port correction values that are valid for initialization vectors employed for selecting initial source port numbers;
  - performing an exclusive-or on the initial source port number and the local port correction value to generate a modified source port number; and
  - generating network packets using the source network address information internal to the PU and the modified source port number, to ensure that a second network packet returning to the network device is hashed using the RSS in the NIC to select the same PU as having received the first network packet, wherein the modified source port number is employed to generate headers for the network packets; and
- when the delta error is determined to be zero, generating network packets using the source network address information internal to the PU and the initial source port number to ensure that the second network packet returning to the network device is hashed using the RSS in the NIC to select the same PU as having received the first network packet.

15. The storage device of claim 14, wherein the initial source port number is a source port number associated with a client device sending the first network packet.

16. The storage device of claim 14, wherein determining the delta error further comprises performing an exclusive-or on a defined number of least significant bits in the first RSS hash and the second RSS hash.

17. The storage device of claim 14, wherein the NIC employs an indirection table that employs an index using a defined number of least significant bits of the RSS hash to select one of the PUs from within the plurality of PUs to send the network packet, the RSS hash being performed using the first flow key.

18. The storage device of claim 14, wherein the first flow key and second flow key comprise a source Internet Protocol (IP) address, a destination IP address, a source port number, and a destination port number.

19. The storage device of claim 14, wherein the initial source port number is selected randomly from a list of available port numbers.

* * * * *